April 12, 1932. W. V. N. POWELSON ET AL 1,853,145
RUDDER CONTROL MEANS FOR AIRSHIPS
Original Filed Sept. 6, 1921
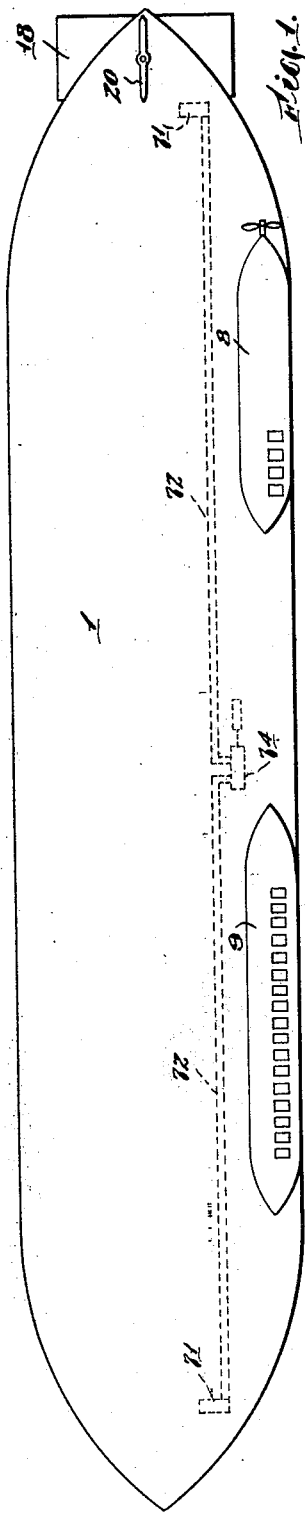
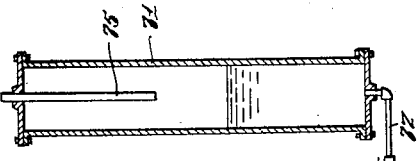
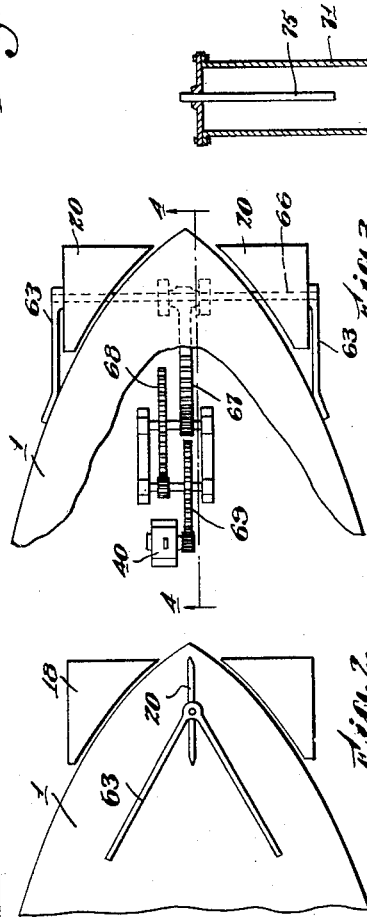
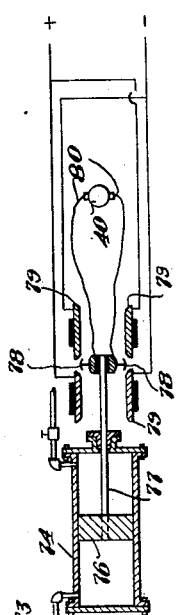
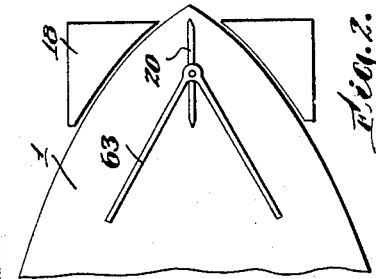
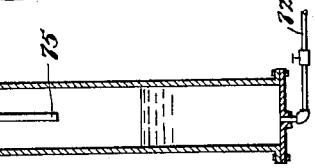
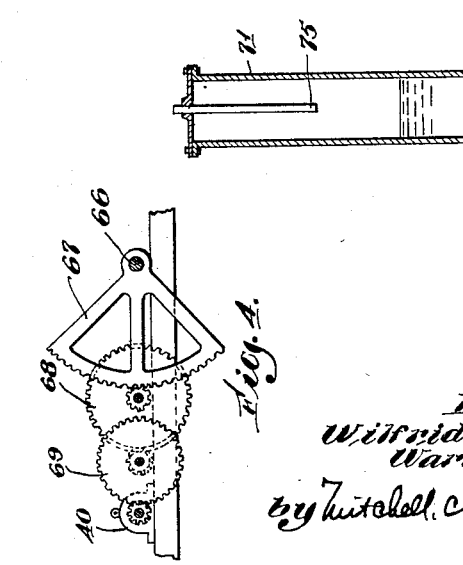
Inventors
Wilfrid V. N. Powelson
Warren Travell
by Mitchell, Chadwick Kent
Attorneys Patented Apr. 12, 1932

1,853,145

UNITED STATES PATENT OFFICE

WILFRID V. N. POWELSON, OF NEW YORK, N. Y., AND WARREN TRAVELL, OF SAN BERNARDINO, CALIFORNIA

RUDDER CONTROL MEANS FOR AIRSHIPS

Original application filed September 6, 1921, Serial No. 498,605. Divided and this application filed March 17, 1931. Serial No. 523,249.

This invention pertains to rudder control means for airships. More particularly, it pertains to apparatus functioning automatically in response to variations from a predetermined or desired condition to bring about appropriate correcting movement of the horizontal rudder. It finds particular usefulness in airships of the dirigible type, but is not limited in its application to such airships.

In the past, it has been necessary to provide one or more members of the crew of an airship for the purpose of operating the horizontal rudder or rudders. On long distance flights, this has meant that perhaps six men must be carried for the sole purpose of attending to the rudder. By the present invention, these men with their equipment are dispensed with and the control effected automatically.

One of the objects of the present invention is to provide means whereby an automatic control of the horizontal rudder may be made possible with the result both of a quicker detection and correction of the deviations which constantly occur, and of eliminating operating expense arising from the necessity of carrying men for attending to the rudder. Briefly stated, the invention comprises a control means operating in response to deviations of the ship from a predetermined angle to the horizontal, to provide corrective movement of the rudder. By this means, the lag which necessarily occurs when the human element is involved is eliminated, the apparatus functioning without appreciable lag after the inception of the deviation.

The accompanying drawings, forming a part hereof, are more or less diagrammatic.

Figure 1 is a side elevation of the airship, showing the general arrangement of apparatus for controlling the movement of the horizontal rudder;

Figure 2 is a side elevation on a larger scale of the stern, also showing the horizontal rudder;

Figure 3 is a plan of the same, showing the power-operated means for moving the rudder;

Figure 4 is a side elevation in section on line 4—4 of Figure 3, showing the power-operated means; and Figure 5 is a sectional side view on a larger scale, and in greater detail, showing the control apparatus for moving the horizontal rudder in response to variations in the inclination of the airship.

The automatic control for maintaining the airship in a horizontal position by means of the rudder is shown in diagram in Figures 3, 4 and 5, which show the principal parts, with minor and incidental parts and connections omitted as such can be readily supplied. Two vessels 71 are located on the airship a suitable distance apart longitudinally. These are connected by piping 72, with valves 73, to a cylinder 74 between them. In the cylinder 74 there is movable a piston 76 with piston rod 77 carrying electrical terminals 78 which make contacts with fixed terminals 79. These terminals are connected by wire 80 to a source of power and to the motor 40.

The vessels 71, pipe 72 and cylinder 74 contain a fluid, preferably non-freezing and of high specific gravity, such as mercury. Change of the pitch of the airship changes the relative elevation of these two vessels and produces a difference of pressure on opposite sides of the piston 76, causing movement thereof and resulting in actuation of the motor 40. A series of gears 68, 69 connects the motor to the quadrant 67, which is keyed to the shaft 66 of the horizontal rudders 20.

It will be seen that this control automatically operates quickly to deflect the rudder, thereby producing a lifting or depressing force opposing and tending to balance the effect of the force which has caused the change in the relative altitudes of the tanks, i. e. to lower or raise the stern end of the airship with respect to its bow end.

The altitudinal direction which the rudder will make normal for the ship depends upon the relative elevations of the vessels 71 in the ship, and the liquid content of the system on one side of the piston 76 as compared to that on the other. Therefore any desired pitch or inclination of direction other than precisely horizontal may be made normal for the ship, by setting one of the tanks higher or lower, and by removing or adding liquid in the system on that side of the piston on which the normal elevation of liquid surface has been changed, so that the piston 76 will be in neutral position when the liquid surfaces are at equal elevation, and the ship's axis is directed at the desired normal inclination, the case chosen for illustration being that in which the normal inclination is horizontal. This setting of inclination is useful for climbing, or descending, or to combat an undesired inclination of axis resulting from the distribution of weights and forces of buoyancy on board.

Obviously, modifications may be made without departing from the inventive thought. Thus the control means shown in the drawings may be employed to adjust surfaces other than the horizontal rudder, although in the present application the horizontal rudder constitutes the preferred embodiment of the invention. Liquids other than mercury may of course be employed in the tanks 71 and pipe 72. Mechanical means may be used in place of the electrical apparatus shown in Figure 5, serving for example, to transmit motion of a piston 76 directly to the rudder.

The subject matter of this application has been divided out of our co-pending application 498,605, filed September 6, 1921 for "airships." It is intended that the patent to be based on the present application shall cover, by suitable expression in the appended claims, what ever features of patentable novelty characterizes the species herein disclosed.

Although the invention is herein described as it may be particularly applied to an airship, it is obvious that it is applicable broadly and with equal effect to any ship wholly immersed in a fluid medium, as, for example, a submarine.

We claim:

1. In equipment for stabilizing a buoyant ship wholly immersed in a fluid medium, the combination of a pipe for liquid associated with the ship and extending for a substantial distance lengthwise thereof; a quantity of liquid in said pipe; the body of liquid as a whole being movable by gravity for a substantial distance to and fro in said pipe; an element movable with the liquid in the midportion of the pipe; and means, automatically controlled by movement of said element, for deflecting the horizontal rudder of the ship.

2. In equipment for stabilizing air ships, a body of liquid arranged on the ship so as to be moved by gravity, relative to the ship, when the angle of the longitudinal axis of the air ship with respect to the horizontal changes, combined with apparatus, operatively controlled by the position of said body with respect to the ship, for moving the horizontal rudder of the airship; the said operative control including a movable element set in the midst of the liquid and free to be propelled therewith to a different location by the difference between liquid pressures on its opposite sides when gravity moves the liquid relative to the ship, and means whereby the change of location of said element governs the said apparatus.

3. In equipment for stabilizing airships, the combination of a duct for liquid, extending on the ship in the direction of a horizontal axis of the airship; a quantity of liquid in said duct; a cylinder, at a point in the midst of the duct, with its ends respectively open to the opposite portions of the duct; a piston movable in said cylinder, actuated by pressure differences on its opposite sides in said cylinder; and means controlled by the position of the piston for deflecting the horizontal rudder of the airship.

4. In equipment for stabilizing airships, the combination of a duct for liquid extending on the ship in the direction of an axis of the ship; a quantity of liquid in said duct; a cylinder in the midst of the duct; and a piston therein, in contact on its opposite sides with the liquid in said duct; electrical apparatus for deflecting the horizontal rudder of the airship; and a switch, controlling said apparatus, connected to move in response to movement of said piston.

Signed at San Bernardino, California, this eleventh day of November 1930.

WILFRID V. N. POWELSON.
WARREN TRAVELL.